United States Patent
Umetsu et al.

(10) Patent No.: US 7,514,144 B2
(45) Date of Patent: Apr. 7, 2009

(54) TABLET, PROCESS FOR PRODUCING THE SAME, AND MOLDED ARTICLE OBTAINED THEREFROM

(75) Inventors: Hideyuki Umetsu, Nagoya (JP); Fumie Shinoda, Nagoya (JP); Yoshiki Makabe, Nagoya (JP)

(73) Assignee: Toray Industries, Inc. (JP)

( * ) Notice: Subject to any disclaimer, the term of this patent is extended or adjusted under 35 U.S.C. 154(b) by 854 days.

(21) Appl. No.: 10/432,390

(22) PCT Filed: May 21, 2002

(86) PCT No.: PCT/JP02/04911

§ 371 (c)(1),
(2), (4) Date: May 21, 2003

(87) PCT Pub. No.: WO02/094529

PCT Pub. Date: Nov. 28, 2002

(65) Prior Publication Data

US 2005/0098916 A1    May 12, 2005

(30) Foreign Application Priority Data

| May 24, 2001 | (JP) | ............................. 2001-156063 |
| Oct. 16, 2001 | (JP) | ............................. 2001-318757 |
| Oct. 16, 2001 | (JP) | ............................. 2001-318759 |
| Oct. 16, 2001 | (JP) | ............................. 2001-318762 |

(51) Int. Cl.
*B32B 5/66* (2006.01)

(52) U.S. Cl. ........................ 428/402; 428/403; 428/404; 428/405; 428/406; 428/407; 428/328; 427/212; 427/384

(58) Field of Classification Search ......... 428/402–407; 427/212, 384
See application file for complete search history.

(56) References Cited

U.S. PATENT DOCUMENTS

| 4,302,413 A | 11/1981 | Howe et al. |
| 5,211,892 A | 5/1993 | Gueret |
| 5,571,356 A | 11/1996 | Skaletz et al. |

FOREIGN PATENT DOCUMENTS

| JP | 48-4558 | 1/1973 |
| JP | 49-18148 | 2/1974 |
| JP | 50-101438 | 8/1975 |
| JP | 51-19051 | 2/1976 |
| JP | 51-59950 | 5/1976 |
| JP | 55-67407 | 5/1980 |
| JP | 1-269521 A | 10/1989 |
| JP | 3-13304 | 1/1991 |
| JP | 05-070325 | 3/1993 |
| JP | 5-235211 A | 9/1993 |
| JP | 6-49271 | 2/1994 |
| JP | 6-226737 A | 8/1994 |
| JP | 6-240070 | 8/1994 |
| JP | 06-320535 | 11/1994 |
| JP | 7-0009479 | 1/1995 |
| JP | 07-088838 | 4/1995 |
| JP | 8-12746 A | 1/1996 |
| JP | 10-000618 | 1/1998 |
| JP | 11-116950 | 4/1999 |
| JP | 2000-167827 | 6/2000 |
| JP | 2000-186214 | 7/2000 |
| JP | 2001-19858 A | 1/2001 |
| JP | 2001-055515 | 2/2001 |
| JP | 2001-89654 A | 4/2001 |
| JP | 2001-214065 | 8/2001 |
| JP | 2002-166462 | 6/2002 |
| WO | WO96/30434 | * 10/1996 |
| WO | WO/96 30434 A1 | 10/1996 |
| WO | WO 96/41836 A1 | 12/1996 |
| WO | WO97/20324 | * 6/1997 |
| WO | WO 97/20324 A1 | 6/1997 |
| WO | WO97/42639 | * 11/1997 |
| WO | WO 97/42639 A1 | 11/1997 |

* cited by examiner

*Primary Examiner*—Leszek Kiliman
(74) *Attorney, Agent, or Firm*—DLA Piper LLP (US)

(57) ABSTRACT

Tablets of thermoplastic resin and filler, in which the compositional ratio of the two is so controlled that the thermoplastic resin accounts for from 1 to 40% by volume and the filler for from 60 to 99% by volume based on the sum of the two, 100% by volume, are obtained by compression-molding thermoplastic resin powder and filler into the tablets, or melt-kneading thermoplastic resin and filler followed by compression-molding the powder of the resulting composition into the tablets. The filler content thereof is high, heretofore unknown in the art, and the tablets efficiently exhibit the properties of the filler therein.

11 Claims, No Drawings

TABLET, PROCESS FOR PRODUCING THE SAME, AND MOLDED ARTICLE OBTAINED THEREFROM

TECHNICAL FIELD

The technology in this disclosure relates to tablets, a method for producing them, and moldings obtained from them.

BACKGROUND

The recent design diversification requires the freedom of the shape of moldings. However, conventional metal moldings are limited in point of the freedom of their shape. Accordingly, filler-reinforced thermoplastic resin is now investigated for a substitute for metal. However, conventional filler-reinforced thermoplastic resin could not satisfy the requirements needed for various applications, such as heat conductivity, electromagnetic wave shieldability and dimensional stability at high temperature, and its properties are now desired to be as similar as possible to the filler alone.

For obtaining a filler-rich composition, proposed is a method of kneading and extruding the constituent components through an extruder with the extruder head kept open (JP-A 8-1663).

In the method, however, since the die is taken of f during kneading, the inner pressure in the extruder barrel could not increase during kneading, and, as a result, thermoplastic resin could not well mix with filler, and the resulting composition could not be uniform and its characteristics may greatly fluctuate.

On the other hand, when filler alone is used to meet the needs as above, it does not bond to each other and only a brittle material could be obtained. When thermosetting resin is used, its moldability and productivity would not be good. When a large amount of filler is introduced into a filler-reinforced thermoplastic resin composition, it is limited in an ordinary melt-kneading process, and a filler-rich material that may have the necessary characteristics is difficult to obtain.

Given that situation, it could be advantageous to provide tablets capable of being processed in melt and capable of efficiently exhibiting the characteristics of the filler used therein, a method for producing them, and their moldings.

SUMMARY

The tablets are characterized in that the compositional ratio of thermoplastic resin to filler therein is such that the thermoplastic resin accounts for from 1 to 40% by volume and the filler for from 60 to 99% by volume based on the sum of the two, 100% by volume.

Preferred embodiments include the following: Regarding the size of the tablets, the maximum value of any of the length, the width, the height or the diameter of the tablets is smaller than 15 mm and the minimum value thereof is at least 1 mm; the shape of the tablets is columnar, disc-like, cubic, elliptic columnar, conical, spherical, ellipsoidal, oval, "Masekku" or prism-like; the specific gravity of the filler is at most 3.5; the filler is fibrous, tabular or flaky; the tablets further contain from 0.1 to 30 parts by weight of a substance (X) that changes from solid into liquid or vapor at a temperature falling between 25 and 250° C.; the tablets further contain from 0.1 to 30 parts by weight of a liquid organic compound of which the viscosity at 25° C. falls between 1 and 5000 mPa·s; and the tablets further contain from 0.1 to 30 parts by weight of a phosphate.

The method for producing tablets comprises compression-molding thermoplastic resin powder and filler into the tablets as above, or melt-kneading thermoplastic resin and filler followed by compression-molding the powder of the resulting composition into the tablets.

Preferred embodiments include the following: Tabletting is effected by the use of a tabletting machine or a briquetting machine; and the thermoplastic resin powder has a number-average particle size of at most 1000 µm.

The moldings are characterized in that they are formed by melt-molding the tablets.

One preferred embodiment comprises injection-molding or injection-pressing the tablets into automobile parts, parts of electric and electronic appliances, and parts of thermal components.

DETAILED DESCRIPTION

"Weight" referred to hereinafter means "mass".

The thermoplastic resin is moldable synthetic resin. Its specific examples include, for example, one or a mixture of two or more selected from non-liquid-crystalline polyesters such as non-liquid-crystalline semi-aromatic polyesters, non-liquid-crystalline full-aromatic polyesters; polycarbonates; polyamides such as aliphatic polyamides, aliphatic-aromatic polyamides, full-aromatic polyamides; polyoxymethylenes, polyimides, polybenzimidazoles, polyketones, polyether-ether ketones, polyether ketones, polyether sulfones, polyether imides, polyphenylene oxides, phenoxy resins, polyphenylene sulfides, liquid-crystalline polymers, olefinic polymers such as polypropylenes, polyethylenes, polystyrenes; olefinic copolymers such as ethylene/propylene copolymers, ethylene/1-butene copolymers, ethylene/propylene/non-conjugated diene copolymers, ethylene/ethyl acrylate copolymers, ethylene/glycidyl methacrylate copolymers, ethylene/vinyl acetate/glycidyl methacrylate copolymers and ethylene/propylene-g-maleic anhydride copolymers, ABS; and elastomers such as polyester-polyether elastomers, polyester-polyester elastomers ("/" means copolymerization—the same shall apply hereinunder).

Specific examples of the non-liquid-crystalline semi-aromatic polyesters include copolyesters such as polyethylene terephthalate, polypropylene terephthalate, polybutylene terephthalate, polyethylene 2,6-naphthalate, polybutylene naphthalate, poly-1,4-cyclohexylene-dimethylene terephthalate and polyethylene-1,2-bis(phenoxy)ethane-4,4'-dicarboxylate, as well as polyethylene isophthalate/terephthalate, polybutylene terephthalate/isophthalate, polybutylene terephthalate/decanedicarboxylate and polycyclohexanedimethylene terephthalate/isophthalate. Specific examples of the polyamides are, for example, ring-cleaved polymers of cyclic lactams, polycondensates of aminocarboxylic acids, and polycondensates of dicarboxylic acids with diamines. Concretely, they include aliphatic polyamides such as nylon 6, nylon 4,6, nylon 6,6, nylon 6,10, nylon 6,12, nylon 11, nylon 12; aliphatic-aromatic polyamides such as poly(metaxylenadipamide), poly(hexamethyleneterephthalamide), poly(hexamethyleneisophthalamide), polynonanemethyleneterephthalamide, poly(tetramethyleneisophthalamide), poly(methylpentamethyleneterephthalamide); and their copolymers. The copolymers include, for example, nylon 6/poly(hexamethyleneterephthalamide), nylon 66/poly(hexamethyleneterephthalamide), nylon 6/nylon 6,6/poly(hexamethyleneisophthalamide), poly(hexamethyleneisophthalamide)/-poly(hexamethyleneterephthalamide), nylon 6/poly(hexamethyleneisophthalamide)/-poly(hexamethyleneterephthalamide), nylon 12/poly (hexamethyleneterephthalamide), poly(methylpentamethyleneterephthalamide)/-poly(hexamethyleneterephthalamide). The copolymerization mode may be any of random or block copolymerization, but random copolymerization is preferred. The liquid-crystalline polymers are resins capable of forming an anisotropic melt phase, for which preferred are those having an ester bond. For example, they include liquid-crystalline polyesters which comprise structural units selected from aromatic oxycarbonyl units, aromatic dioxy units, aromatic and/or aliphatic dicarbonyl units, alkylenedioxy units and the like and which may form an anisotropic melt phase; and liquid-crystalline polyester-amides which comprise any of the above-mentioned structural units and other structural units selected from aromatic iminocarbonyl units, aromatic diimino units, aromatic iminoxy units and the like and which may form an anisotropic melt phase. Concretely, they include liquid-crystalline polyesters that comprise structural units derived from p-hydroxybenzoic acid and 6-hydroxy-2-naphthoic acid; liquid-crystalline polyesters that comprise structural units derived from p-hydroxybenzoic acid, structural units derived from 6-hydroxy-2-naphthoic acid, and structural units derived from aromatic dihydroxy compounds and/or aliphatic dicarboxylic acids; liquid-crystalline polyesters that comprises structural units derived from p-hydroxybenzoic acid, structural units derived from 4,4'-dihydroxybiphenyl, and structural units derived from aromatic dicarboxylic acids such as terephthalic acid or isophthalic acid and/or aliphatic dicarboxylic acids such as adipic acid or sebacic acid; liquid-crystalline polyesters that comprise structural units derived from p-hydroxybenzoic acid, structural units derived from ethylene glycol, and structural units derived from terephthalic acid; liquid-crystalline polyesters that comprise structural units derived from p-hydroxybenzoic acid, structural units derived from ethylene glycol, and structural units derived from terephthalic acid and isophthalic acid; liquid-crystalline polyesters that comprises structural units derived from p-hydroxybenzoic acid, structural units derived from ethylene glycol, structural units derived from 4,4'-dihydroxybiphenyl, and structural units derived from terephthalic acid and/or aliphatic dicarboxylic acids such as adipic acid or sebacic acid; liquid-crystalline polyesters that comprises structural units derived from p-hydroxybenzoic acid, structural units derived from ethylene glycol, structural units derived from aromatic dihydroxy compounds, and structural units derived from aromatic dicarboxylic acids such as terephthalic acid, isophthalic acid or 2,6-naphthalenedicarboxylic acid, etc. The liquid-crystalline polyester-amides are those which further comprise p-iminophenoxy units derived from p-aminophenols in addition to the structural units selected from aromatic oxycarbonyl units, aromatic dioxy units, aromatic and/or aliphatic dicarbonyl units, alkylenedioxy units and the line and which may form an anisotropic melt phase.

Of the liquid-crystalline polyesters and the liquid-crystalline polyester-amides, preferred examples are liquid-crystalline polyesters that comprise structural units of the following (I), (II), (III) and (IV); and liquid-crystalline polyesters that comprise the structural units of (I), (III) and (IV).

Especially preferred are the liquid-crystalline polyesters that comprise the structural units of (I), (II), (III) and (IV).

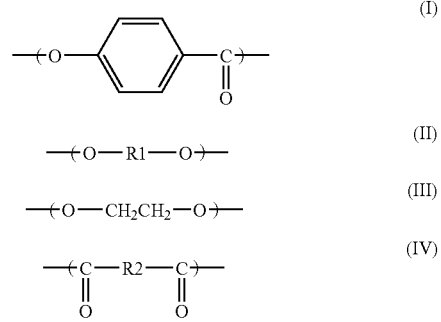

wherein R1 represents at least one group selected from

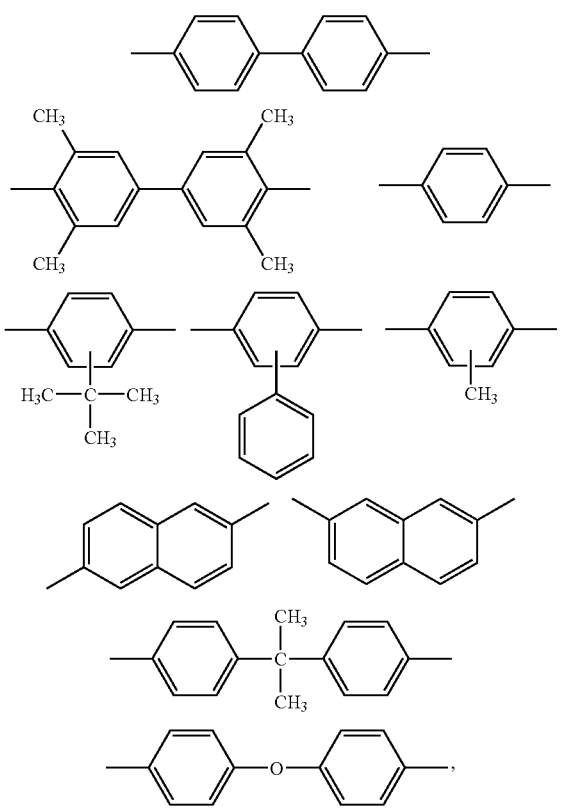

R2 represents at least one group selected from

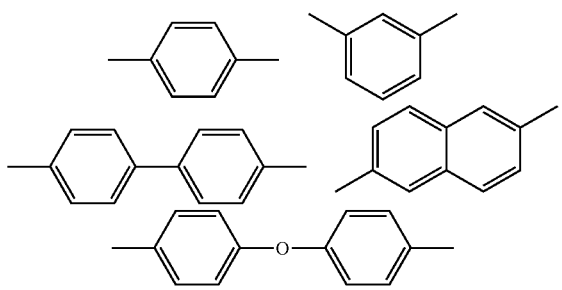

-continued

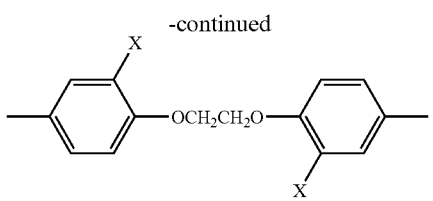

X represents a hydrogen atom or a chlorine atom.

The structural unit (I) is derived from p-hydroxybenzoic acid; the structural units (II) are those derived from one or more aromatic dihydroxy compounds selected from 4,4'-dihydroxybiphenyl, 3,3',5,5'-tetramethyl-4,4'-dihydroxybiphenyl, hydroquinone, t-butylhydroquinone, phenylhydroquinone, methylhydroquinone, 2,6-dihydroxynaphthalene, 2,7-dihydroxynaphthalene, 2,2-bis(4-hydroxyphenyl)propane and 4,4'-dihydroxydiphenyl ether; the structural unit (III) is derived from ethylene glycol; and the structural units (IV) are those derived from one or more aromatic dicarboxylic acids selected from terephthalic acid, isophthalic acid, 4,4'-diphenyldicarboxylic acid, 2,6-naphthalenedicarboxylic acid, 1,2-bis(phenoxy)ethane-4,4'-dicarboxylic acid, 1,2-bis (2-chlorophenoxy)ethane-4,4'-dicarboxylic acid and 4,4'-diphenylether-dicarboxylic acid. Of the units, especially preferred are those in which R1 is

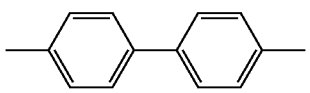

and R2 is

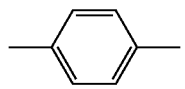

The preferred liquid-crystalline polyesters are, as so mentioned hereinabove, one or more selected from the copolymers that comprise the structural units (I), (III) and (IV), and the copolymers that comprise the structural units (I), (II), (III) and (IV). In these, the structural units (I), (II), (III) and (IV) may be copolymerized in any desired ratio. However, for exhibiting the characteristics, the copolymerization ratio is preferably as follows:

Specifically, in the copolymer of the structural units (I), (II), (III) and (IV), the total of the structural units (I) and (II) is preferably from 30 to 95 mol %, more preferably from 40 to 85 mol % of the total of the structural units (I), (II) and (III). Also preferably, the structural units (III) account for from 5 to 70 mol % of the total of the structural units (I), (II) and (III), more preferably from 15 to 60 mol %. Also preferably, the molar ratio of the structural units (I) to (II) [(I)/(II)] falls between 75/25 and 95/5, more preferably between 78/22 and 93/7. Also preferably, the structural units (IV) are substantially equimolar to the total of the structural units (II) and (III).

On the other hand, in the copolymer with no structural unit (II), the structural units (I) preferably account for from 40 to 90 mol % of the total of the structural units (I) and (III), more preferably from 60 to 88 mol % in view of the flowability of the copolymer. Also preferably, the structural units (IV) are substantially equimolar to the structural units (III).

The wording "substantially equimolar" referred to herein means that the units in question are equimolar to each other in the polymer backbone chain except the terminals but the units that constitute the terminals are not always equimolar to each other.

For the liquid-crystalline polyester-amides, also preferred are those which contain p-iminophenoxy units derived from p-aminophenols in addition to the above-mentioned structural units (I) to (IV) and which may form an anisotropic melt phase.

The liquid-crystalline polyesters and the liquid-crystalline polyester-amides that are preferred for use herein may be copolymerized with any other comonomers not detracting from the liquid-crystallinity of the polyesters, in addition to the components to constitute the above-mentioned structural units (I) to (IV). The comonomer includes, for example, aromatic dicarboxylic acids such as 3,3'-diphenyldicarboxylic acid, 2,2'-diphenyldicarboxylic acid; aliphatic dicarboxylic acids such as adipic acid, azelaic acid, sebacic acid, dodecane-dicarboxylic acid; alicyclic dicarboxylic acids such as hexahydroterephthalic acid; aromatic diols such as chlorohydroquinone, 3,4'-dihydroxybiphenyl, 4,4'-dihydroxydiphenyl sulfone, 4,4'-dihydroxydiphenyl sulfide, 4,4'-dihydroxybenzophenone, aliphatic, alicyclic diols such as propylene glycol, 1,4-butanediol, 1,6-hexanediol, neopentyl glycol, 1,4-cyclohexanediol, 1,4-cyclohexanedimethanol; aromatic hydroxycarboxylic acids such as m-hydroxybenzoic acid, 2,6-hydroxynaphthoic acid; and p-aminobenzoic acid.

The method for producing the liquid-crystalline polyesters for use in the invention is not specifically defined, and the polyesters may be produced in accordance with any known polycondensation to give polyesters.

For example, the liquid-crystalline polyesters are preferably produced according to the methods mentioned below.

(1) A method of producing liquid-crystalline polyesters through deacetylating polycondensation of p-acetoxybenzoic acid with a diacylated derivative of an aromatic dihydroxy compound such as 4,4'-diacetoxybiphenyl or diacetoxybenzene and an aromatic dicarboxylic acid such as 2,6-naphthalenedicarboxylic acid, terephthalic acid or isophthalic acid.

(2) A method of producing liquid-crystalline polyesters through acylation at the phenolic hydroxyl group with acetic anhydride followed by deacetylating polycondensation of p-hydroxybenzoic acid with an aromatic dihydroxy compound such as 4,4'-dihydroxybiphenyl or hydroquinone and an aromatic dicarboxylic acid such as 2,6-naphthalenedicarboxylic acid, terephthalic acid or isophthalic acid.

(3) A method of producing liquid-crystalline polyesters through dephenolating polycondensation of phenyl p-hydroxybenzoate with an aromatic dihydroxy compound such as 4,4'-dihydroxybiphenyl or hydroquinone and a diphenyl ester of an aromatic dicarboxylic acid such as 2,6-naphthalenedicarboxylic acid, terephthalic acid or isophthalic acid.

(4) A method of producing liquid-crystalline polyesters through diphenyl esterification of p-hydroxybenzoic acid and an aromatic dicarboxylic acid such as 2,6-naphthalenedicarboxylic acid, terephthalic acid or isophthalic acid with a predetermined amount of diphenyl carbonate followed by dephenolating polycondensation of the resulting diphenyl esters with an aromatic dihydroxy compound such as 4,4'-dihydroxybiphenyl or hydroquinone.

(5) A method of producing liquid-crystalline polyesters according to (1) or (2) in the presence of a polyester polymer or oligomer such as polyethylene terephthalate or a bis(β-hydroxyethyl)ester of an aromatic dicarboxylic acid such as bis(β-hydroxyethyl) terephthalate.

Preferably, the melt viscosity of the liquid-crystalline polyesters for use in the invention is from 0.5 to 80 Pa·s, more preferably from 1 to 50 Pa·s, in order to prevent the flowability depression in the filler-rich compositions of the polyester. For obtaining the compositions of better flowability, the melt viscosity of the polyesters is preferably at most 40 Pa·s.

The melt viscosity is measured in a vertical flow tester at a temperature of the melting point (Tm) of the polymer+10° C. and at a shear rate of 1,000 (1/sec).

The melting point (Tm) is measured through differential calorimetry, as follows: After prepared through polymerization, the polymer is heated from room temperature at a heating rate of 20° C./min, and the endothermic peak temperature (Tm1) of the polymer is read. Thus heated, the polymer is kept at a temperature of Tm1+20° C. for 5 minutes, then once cooled to room temperature at a cooling rate of 20° C./min, and again heated at a heating rate of 20° C./min, and the endothermic peak temperature (Tm2) in the last heat cycle is read. The temperature Tm2 is the melting point Tm of the polymer.

Of the above-mentioned thermoplastic resins, preferred in view of their mechanical properties and moldability are one or more selected from non-liquid-crystalline polyesters such as polybutylene terephthalate, polybutylene naphthalate, poly-1,4-cyclohexylene-dimethylene terephthalate, polyethylene 2,6-naphthalate and polyethylene terephthalate; polyethylene 2,6 and polyethylene terephthalate; polyamides such as nylon 6, nylon 6,6,, nylon 12, nylon 4,6, polynonanemethyleneterephthalamide, nylon 6/poly(hexamethyleneterephthalamide), nylon 66/poly(hexamethyleneterephthalamide), nylon 6/nylon 6,6/poly(hexamethyleneisophthalamide), poly(hexamethyleneisophthalamide),-poly(hexamethyleneisophthalamide), nylon 6/poly(hexamethyleneterephthalamide-poly(hexamethyleneisophthalamide), nylon 12/poly(hexamethyleneterephthalamide), nylon 6/nylon 6,6/poly(hexamethyleneisophthalamide), poly(hexamethyleneterephthalamide)/-poly(hexamethyleneterephthalamide); liquid-crystalline polyesters that comprise structural units derived from p-hydroxybenzoic acid and 6-hydroxy-2-naphthoic acid; liquid-crystalline polyesters that comprise structural units derived from p-hydroxybenzoic acid, structural units derived from ethylene glycol, structural units derived from 4,4'-dihydroxybiphenyl and structural units derived from terephthalic acid and/or aliphatic dicarboxylic acid such as adipic acid or sebacic acid; liquid-crystalline polyesters that comprise structural units derived from p-hydroxybenzoic acid, structural units derived from ethylene glycol, structural units derived from ethylene glycol, structural units derived from aromatic dihydroxy compounds, and structural units derived from aromatic dicarboxylic acids such as terephthalic acid, isophthalic acid or 2,6-naphthalenedicarboxylic acid; polycarbonates, polyphenylene sulfides, polyethylenes, polypropylenes, polystyrenes, ABS, polyphenylene oxides, and phenoxy resins.

Above all, especially preferred are nylon 6, polycarbonates, polybutylene terephthalates, polyphenylene sulfides; as well as liquid-crystalline polyesters that comprise structural units derived from p-hydroxybenzoic acid and 6-hydroxy-2-naphthoic acid; liquid-crystalline polyesters that comprises structural units derived from p-hydroxybenzoic acid, structural units derived from ethylene glycol, structural units derived from aromatic dihydroxy compounds, and structural units derived from terephthalic acid; and liquid-crystalline polyesters that comprise structural units derived from p-hydroxybenzoic acid, structural units derived from ethylene glycol, and structural units derived from terephthalic acid.

The filler includes fibrous fillers, or non-fibrous fillers such as tabular, flaky, granular, amorphous or ground fillers. Concretely, for example, they are glass fibers; carbon fibers such as PAN or pitch fibers; metal fibers such as stainless fibers, aluminium fibers, brass fibers; organic fibers such as aromatic polyamide fibers; gypsum fibers, ceramic fibers, asbestos fibers, zirconia fibers, alumina fibers, silica fibers, titanium oxide fibers, silicon carbide fibers, rock wool, potassium titanate whiskers, barium titanate whiskers, aluminium borate whiskers, silicon nitride whiskers, mica, talc, kaolin, silica, calcium carbonate, glass beads, glass flakes, glass microballoons, clay, molybdenum disulfide, wollastonite, titanium oxide, zinc oxide, calcium polyphosphate, metal powder, metal flakes, metal ribbons, metal oxides, carbon powder, graphite, carbon flakes, flaky carbon, nanocarbon tubes, etc. Specific examples of the type of the metal of the metal powder, the metal flakes and the metal ribbons are silver, nickel, copper, zinc, aluminium, stainless, iron, brass, chromium and tin. Regarding the type of the glass fibers and the carbon fibers, they are not specifically defined and may be any ones that are generally used for resin reinforcement. For example, they may be any of long fibers or short fibers such as chopped strands and milled fibers, and may be selected from any of these. Of the fillers mentioned above, preferred are fibrous, tabular or flaky fillers and ground fillers as the resin composition containing them may be readily formed into tablets. More preferred are fibrous, tabular or flaky fillers in view of the strength of the moldings with them. The fibrous fillers may be any ordinary fibrous fillers and include whiskers. Regarding their shape, the ratio (aspect ratio) of (mean fiber length or mean major diameter)/(mean fiber diameter or mean minor diameter) may fall between 3 and 10000 or so. The tabular or flaky fillers may also be any ordinary tabular or flaky fillers, and they have some thickness relative to their major diameter. Regarding their shape, for example, the ratio of (mean major diameter)/(mean thickness) falls between 3 and 5000 or so. The granular fillers are relatively nearly spherical. Regarding their shape, for example, the ratio of (mean major diameter)/(mean minor diameter) is smaller than 2 or so. The amorphous fillers do not have any regular shape, for example, ground fillers. The shape of these fillers (mean fiber length/mean fiber diameter, mean major diameter/mean thickness, mean major diameter/mean minor diameter) is determined by measuring the fiber length, the fiber diameter, the major diameter and the minor diameter of 100 samples of one filler through a scanning electronic microscope (SEM), and the data are averaged.

For good balance of the mechanical strength and the warping resistance of the moldings, two or more different types of fillers may be combined. For example, glass fibers may be combined with mica or kaolin; or glass fibers with glass beads; or carbon fibers with mica or kaolin; or carbon fibers with graphite, etc.

The surfaces of the fillers may be processed with any known coupling agent (e.g., silane coupling agent, titanate coupling agent), or with any other surface-treating agent. Also if desired, the fillers may be coated with an electroconductive substance.

The glass fibers may be coated or bundled with thermoplastic resin such as ethylene/vinyl acetate copolymer or with thermosetting resin such as epoxy resin.

The ratio of the thermoplastic resin to the filler is determined in order that the filler may exhibit its properties well balanced with the melt workability of the resin composition. Concretely, in general, the thermoplastic resin accounts for from 1 to 50% by volume and the filler for from 50 to 99% by volume, based on the total of the thermoplastic resin and the filler, 100% by volume. Preferably, the thermoplastic resin accounts for from 1 to 40% by volume and the filler for from 60 to 99% by volume; more preferably, the thermoplastic resin accounts for from 2 to 25% by volume and the filler for from 75 to 98% by volume; even more preferably, the thermoplastic resin accounts for from 3 to 20% by volume and the filler for from 80 to 97% by volume; and still more preferably, the thermoplastic resin accounts for from 3% by volume to less than 15% by volume and the filler for from more than 85% by volume to 97% by volume.

The tablets may further contain a substance (X) that dynamically changes from solid into liquid or vapor at a temperature falling between 25 and 250° C. This is for satisfying both the requirement of shape retention of the tablets and the requirement of metrical stability in stable collapse of the tablets during molding.

The substance (X) is a substance that dynamically changes from solid into flowable liquid or vapor at a temperature falling between 25 and 250° C. The substance of the type includes, for example, monoalcohol esters of fatty acids, metal salts of fatty acids, monoalcohol esters of polybasic acids, fatty acid esters of polyalcohols, and their derivatives, fatty acid esters of glycerin, silicone resins, phenolic compounds, phosphite compounds, thioether compounds, benzophenone compounds, amido group-having compounds, cyanurate compounds and their salts, of which the melting point of the softening point falls between 40 and 250° C. Concretely, they are methyl stearate, myristyl myristate, stearyl stearate, sodium stearate, calcium stearate, magnesium stearate, potassium stearate, lithium stearate, zinc stearate, barium stearate, aluminium stearate, sodium montanate, calcium montanate, magnesium montanate, potassium montanate, lithium montanate, zinc montanate, barium montanate, aluminium montanate, distearyl phthalate, sorbitan tristearate, sorbitan monostearate, sorbitan monostearate, sorbitan distearate, sorbitan monopalmitate, sorbitan monostearate, polyethylene glycol monostearate, polyethylene glycol distearate, polypropylene glycol monostearate, pentaerythritol monostearate, stearomonoglyceride, palmitostearomonoglyceride, stearomono/diglyceride, stearo-oleomono/diglyceride, behenomonoglyceride, behenomoglyceride, behenyl methacrylate, montanates and their derivatives, stearates and their derivatives, bisphenol-type monofunctional and polyfunctional epoxy compounds, 2,2-methylenebis(4,6-di-t-butylphenyl)octyl phosphate, di(2,4-di-butylphenyl)pentaerythritol diphosphate, bis-(2,6-di-t-butyl-4-methylphenyl)pentaerythritol diphosphate, triethylene glycol bis-(3-(3-t-butyl-5-methyl-4-hydroxyphenyl)propionate), 1,6-hexanediol bis(3-(3,5-di-t-butyl-4-hydroxyphenyl)propionate), 2,4-bis(n-octylthio)-6-(4-hydroxy-3,5-di-t-butylanilino)-1,3,5-triazine, pentaerythrityl tetrakis(3-(3,5-di-t-butyl-4-hydroxyphenyl)propionate), 2,2-thiodiethylenebis(3-(3,5-di-t-butyl-4-hydroxyphenyl)-propionate), octadecyl-3-(3,5-di-t-butyl-4-hydroxyphenyl)-propionate, N,N'-hexamethylenebis(3,5-di-t-butyl-4-hydroxy-hydrocinnamide), diethyl 3,5-di-t-butyl-4-hydroxybenzylphosphonate, 1,3,5-trimethyl-2,4,6-tris(3,5-di-t-butyl-4-hydroxybenzyl)benzene, tris(3,5-di-t-butyl-4-hydroxybenzyl)isocyanurate,bisphenol A pentaerythritol phosphite, tris(2,4-di-t-butylphenyl)phosphate, di(2,4-di-t-butylphenyl)pentaerythritol diphosphite, bis(2,6-di-t-butyl-4-methylphenyl)pentaerythritol diphosphite, terpenephenol, 2-hydroxy-4-n-octyloxybenzophenone, ethylenebisstearylamide, ethylenebisoleylamide, stearylercamide, triallyl cyanurate, melamine/cyanurate salt, 2,5-bis(5'-t-butylbenzoxazoyl(2))thiophene, and epoxy, methacryl or amino group-containing or non-functional silicone resins. In addition, substances that are solid at 25° C. or lower but change into vapor at a temperature falling between 25 and 250° C., such as decomposing foaming agents are also usable herein. Concretely, they are azodicarbonamide, azobisisobutyronitrile, N,N'-dinitrosopentamethylenetetramine, p,p'-dinitrosopentamethylenetetramine, p,p'-oxybisbenzenesulfonylhydrazine, barium azodicarboxylate, trihydrazinotriazine, and 5-phenyltetrazole.

The substance (X) may be one of the above-mentioned substances or may also be a mixture of two or more of them.

The substance (X) must indispensably change from solid into liquid or vapor at a temperature falling between 25 and 250° C. from the viewpoint of the handlability and the melt plasticizability of the resin composition that contains it. Preferably, it changes from solid into liquid or vapor at a temperature falling between 40 and 230° C., more preferably between 50 and 220° C., even more preferably 60 and 200° C.

The substance (X) is solid in the tablets being produced, and it changes into liquid or vapor when the tablet-type composition is molded in melt. It is presumed that the substance (X) will satisfy both the requirement of shape retention of the tablets and the requirement of metrical stability in stable collapse of the tablets during molding.

The amount of the substance (X) to be in the tablets is from 0.1 to 30 parts by weight, preferably from 0.1 to 25 parts by weight, more preferably from 1 to 20 parts by weight, even more preferably from 2 to 15 parts by weight, still more preferably from 3 to 10 parts by weight relative to 100 parts by weight of the total of the thermoplastic resin and the filler.

If its amount is larger than the range defined herein, the substance (X) will bleed out on the surfaces of the moldings and will cause interfacial peeling between the thermoplastic resin and the filler, and, as a result, the mechanical properties of the moldings will be worse; but if smaller than the range, its effect for satisfying the requirement of metrical stability in stable collapse of tablets during molding will be low.

The tablets may further contain a liquid organic compound of which the viscosity at 25° C. falls between 1 and 5000 mPa·s. This is for reducing the compositional distribution in producing the tablets and for unifying the collapse of the tablet-type composition being molded in melt to thereby stabilize the metering time during molding. The liquid organic compound of which the viscosity at 25° C. falls between 1 and 5000 mPa·s is an organic compound that is liquid and flowable at 25° C. The substance includes, for example, monoalcohol esters of fatty acids, monoalcohol esters of polybasic acids, fatty acid esters of polyalcohols, and their derivatives, fatty, acid esters of glycerin, silicone oils, phosphite compounds and the like of which the melting point is lower than 25° C. Concretely, they are cetyl 2-ethylhexanoate, methyl esters of coconut oil fatty acids, methyl laurate, isopropyl myristate, octyldodecyl myristate, butyl stearate, 2-ethylhexyl stearate, isotridecyl stearate, methyl caprate, methyl myristate, methyl oleate, octyl oleate, lauryl oleate, oleyl oleate, 2-ethylhexyl oleate, decyl oleate, octyldodecyl oleate, isobutyl oleate, dimethyl adipate, dioleyl adipate, adipates, ditridecyl phthalate, diisobutyl adipate, diisodecyl adipate, dibutylglycol adipate, 2-ethylhexyl phthalate, diisononyl phthalate, didecyl phthalate, tri-2-ethylhexyl trimellitate, triisodecyl trimellitate, sorbitan monolaurate, sorbitan trioleate, sorbitan monooleate, sorbitan sesquioleate, sorbitan monolaurate, polyoxymethylene sorbitan monolaurate, polyoxymethylene sorbitan monopalminate, polyoxymethylene sorbitan monostearate, polyoxymethylene sorbitan monooleate, polyoxymethylene sorbitan tetraoleate, polyethylene glycol, polyethylene glycol monolaurate, polyethylene glycol monooleate, polyoxyethylene bisphenol A lauryl ester, pentaerythritol, pentaerythritol monooleate, oleomono/diglyceride, oleomonoglyceride, 2-ethylhexanotriglyceride, capromono/diglyceride, caprotriglyceride, lauryl methacrylate, myristyl methacrylate, dimethyl phthalate, diethyl phthalate, dibutyl phthalate, diheptyl phthalate, di-2-ethylhexyl phthalate, di-n-octyl phthalate, diisodecyl phthalate, butylbenzyl phthalate, diisononyl phthalate, ethylphthalylethylene glycolate, tri-2-ethylhexyl trimellitate, methylacetyl ricinoleate, glyceryl triacetate, 2-ethylhexyl acetate, triphenyl phosphite, dibutylhydrogen phosphite, dimethylsilicone oil, methylphenylsilicone oil, methylhydrogensilicone oil, alkyl-modified silicone oil, polyether-modified silicone oil, alcohol-modified silicone oil, amino-modified silicone oil, epoxy-modified silicone oil, phenol-modified silicone oil, carboxyl-modified silicone oil, hexatridecyl-1,1,3-tris(2-methyl-4-hydroxyl-5-t-butylphenyl)butane triphosphite, and tetratridecyl-4,4'-butylidenebis-(3-methyl-6-t-butylphenol) diphosphite.

One or more of such liquid organic compounds of which the viscosity at 25° C. falls between 1 and 5000 mPa·s may be used either singly or as combined in producing the tablets.

The viscosity at 25° C. of the liquid organic compound must indispensably fall between 1 and 5000 mPa·s, but preferably between 2 and 2000 mPa·s, more preferably between 10 and 500 mPa·s from the viewpoint of the dispersibility of the liquid crystal compound in the composition and for ensuring the effect of stabilizing the metering time in molding.

The viscosity at 25° C. of the compound is measured with a rotary viscometer (B-type viscometer).

It is presumed that the liquid organic compound may uniformly disperse in the composition to form the tablets and will enable uniform collapse of the tablets in metering them for molding in melt to thereby stabilize the metering time in molding.

The amount of the liquid organic compound to be added to the tablets may be from 0.1 to 30 parts by weight, preferably from 0.1 to 25 parts by weight, more preferably from 1 to 20 parts by weight, even more preferably from 2 to 15 parts by weight, still more preferably from 3 to 10 parts by weight relative to 100 parts by weight of the total of the thermoplastic resin and the filler.

If its amount is larger than the range defined herein, the liquid organic compound will bleed out on the surfaces of the moldings and will cause interfacial peeling between the thermoplastic resin and the filler, and, as a result, the mechanical properties of the moldings will be worse; but if smaller than the range, it will be ineffective for stabilizing the metering time in molding to thereby prevent the properties of the moldings from fluctuating.

The tablets may further contain a phosphate for improving the easy collapse and flowability of the tablets during molding. The phosphate is selected from phosphoric monoesters, diesters, triesters and tetraesters, preferably including those of the following formula (1):

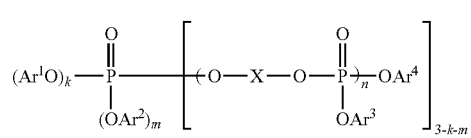

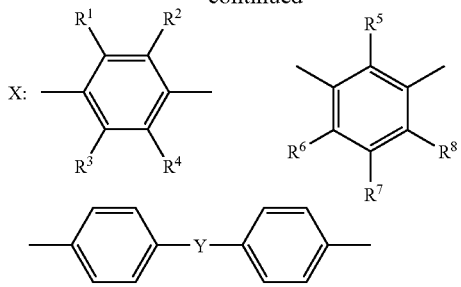

The structure of the phosphates of formula (1) is described. In formula (1), n indicates an integer of 0 or more, preferably from 0 to 10, more preferably from 0 to 5. Its uppermost limit is preferably at most 40 in view of the dispersibility of the compounds.

k and m each indicate an integer of from 0 to 2, and (k+m) is an integer of from 0 to 2. Preferably, k and m each are an integer of 0 or 1; more preferably, k and m each are 1.

In formula (1), $R^3$ to $R^{10}$ are the same or different and each represents a hydrogen atom or an alkyl group having from 1 to 5 carbon atoms. Specific examples of the alkyl group having from 1 to 5 carbon atoms are a methyl group, an ethyl group, an n-propyl group, an isopropyl group, an n-butyl group, a sec-butyl group, a tert-butyl group, an n-isopropyl group, a neopentyl group, a tert-pentyl group, a 2-isopropyl group, a tert-pentyl group, a 3-isopropyl group, a tert-pentyl group, a neoisopropyl group, a neopentyl group, a tert-pentyl group, etc. For these, preferred are a hydrogen atom, a methyl group and an ethyl group; and more preferred is a hydrogen atom.

$Ar^1$, $Ar^2$, $Ar^3$ and $Ar^4$ are the same or different and each represents an aromatic group or an aromatic group substituted with a halogen-free organic residue. The aromatic group includes those having any of a benzene, naphthalene, indene or anthracene skeleton, and preferred are those having a benzene or naphthalene skeleton. These may be substituted with a halogen-free organic residue (preferably an organic residue having from 1 to 8 carbon atoms). Though not specifically defined, the number of the substituents that may be in the group is preferably from 1 to 3. Concretely, the aromatic group includes a phenyl group, a tolyl group, a xylyl group, a cumenyl group, a mesityl group, a naphthyl group, an indenyl group, an anthryl group, etc. Preferred are a phenyl group, a tolyl group, a xylyl group, a cumenyl group and a naphthyl group; and more preferred are a phenyl group, a tolyl group and a xylyl group.

Y represents a direct bond, or O, S, $SO_2$, $C(CH_3)_2$, $CH_2$ or CHPh, and Ph represents a phenyl group.

Specific examples of the phosphates are one or more selected from Daihachi Chemical's PX-200, PX-201, PX-130, CR-733S, TPP, CR-741, CR-747, TCP, TXP and CDP. Of those, preferred are one or more selected from PX-200, TPP, CR-733R, CR-741 and CR-747; even more preferred are PX-200, CR-733S and CR-741; and most preferred is PX-200.

One or more such phosphates may be used either singly or as combined.

The ability of the phosphate to plasticize the molding resin composition is good. In addition, the phosphate has a good affinity for the thermoplastic resin and the filler. Therefore, it is presumed that the phosphate in tablets will satisfy both the requirement of shape retention of the tablets and the requirement of metrical stability in stable collapse of the tablets during molding, and, in addition, it will improve the molding resin flowability in molds.

The amount of the phosphate that may be in the tablets is from 0.1 to 30 parts by weight, preferably from 0.1 to 25 parts by weight, more preferably from 1 to 20 parts by weight, even more preferably from 2 to 15 parts by weight, still more preferably from 3 to 10 parts by weight relative to 100 parts by weight of the total of the thermoplastic resin and the filler.

If its amount is larger than the range defined herein, the phosphate will bleed out on the surfaces of the moldings and will cause interfacial peeling between the thermoplastic resin and the filler, and, as a result, the mechanical properties of the moldings will be worse; but if smaller than the range, its effect of improving the metering stability and the flow stability in molding will be low.

Other components may be added to the tablets so long they do not interfere with the effect, They include, for example, antioxidant and heat-resistant stabilizer (hindered phenols, hydroquinones, phosphites and their substituted derivatives, etc.), weather-resisting agent (resorcinols, salicylates, benzotriazoles, benzophenones, hindered amines, etc.), mold release agent and lubricant (montanic acid and its metal salts, esters and half-esters, stearyl alcohol, stearamide, various bisamides, bisurea and polyethylene wax, etc.), pigment (cadmium sulfide, phthalocyanine, coloring carbon black, etc.), dye (nigrosine, etc.), nucleating agent (talc, silica, kaolin, clay, etc.), plasticizer (octyl p-oxybenzoate, N-butyl-benzenesulfonamide, etc.), antistatic agent (alkylsulfate-type anionic antistatic agent, quaternary ammonium-type cationic antistatic agent, nonionic antistatic agent such as polyoxyethylene sorbitan monostearate, betaine-type ampholytic antistatic agent, etc.), flame retardant (e.g., red phosphorus, phosphates, melamine cyanurate, hydroxides such as magnesium hydroxide or aluminium hydroxide, ammonium polyphosphate, polystyrene bromide, polyphenylene ether bromide, polycarbonate bromide, epoxy resin bromide, or combinations of any of these bromine-containing flame retardants with antimony trioxide, etc.), and other polymers.

The tablets may be obtained by compression-molding powdery raw material. For compression-molding, preferably used is a tabletting machine (rotary, single-shot, double-shot or triple-shot type) or a briquetting machine. The powdery raw material includes powder of thermoplastic resin (thermoplastic resin powder) and filler to be in the resin composition. If desired, thermoplastic resin and filler may be melt-kneaded, and the resulting composition may be formed into powder for use herein. One or more of these are suitably selected and combined to reach the desired composition.

The tablets may be obtained, for example, by uniformly blending thermoplastic resin powder and filler in a solid phase in a Banbury mixer, a kneader, a roll, a single-screw or double-screw extruder or the like, followed by tabletting the resulting blend in a tabletting machine or a briquetting machine. If desired, thermoplastic resin and filler may be previously dry-blended in a Banbury mixer, a kneader or a roll, or not being dry-blended, they may be once melt-kneaded in a single-screw or double-screw extruder, then cooled and ground into powder, and the resulting powdery mixture may be tabletted in a tabletting machine or a briquetting machine. In this case, the thermoplastic resin to be melt-kneaded with filler is not specifically defined and may be powdery or in the form of pellets so far as it is melt-kneadable. Preferably, however, it is powdery or a ground matter in order to prevent filler dispersion failure therein that may cause fluctuation of the characteristics of moldings. In case where the composition that has been previously melt-kneaded in a single-screw or double-screw extruder is powdered, the flowability of the resulting powder will be poor if the amount of filler is too large. If so, the powder could not be extruded out through the die and could not be well pelletized. In such a case, the mixture may be kneaded and extruded out while the head of the extruder is kept opened, as in JP-A 8-1663. If the amount of the filler is large, a flaky composition may be obtained. The pellets or flakes thus obtained by previously melt-kneading the components according to these methods are, if desired, cooled and ground into powder and then tabletted. Also if desired, these methods may be combined for producing the tablets. Concretely, the composition prepared by melt-kneading thermoplastic resin and filler is mixed with thermoplastic resin powder and/or filler so that the contents of the resin and the filler could be desired ones, and thereafter the resulting mixture may be tabletted. Of the methods mentioned above, preferred is the method of uniformly blending thermoplastic resin powder and filler in a solid phase followed by tabletting the resulting mixture in a tabletting machine or a briquetting machine, as it is simple.

The thermoplastic resin powder may be thermoplastic resin powder itself which is generally available as powder, and may also be obtained by grinding pellets at room temperature or grinding frozen pellets. For grinding frozen pellets, the resin is once frozen with dry ice, liquid nitrogen or the like. The frozen pellets are then ground in any known manner, for example, with an ordinary hummer-type grinder, cutter-type grinder or stone gristmill-type grinder. The thermoplastic resin powder for use in the invention is preferably such that the number-average particle size in terms of the maximum major diameter of the resin particles is at most 1000 µm, more preferably at most 800 µm, even more preferably at most 500 µm for unifying the composition of the resulting tablets and for improving the handlability of the tablets. For obtaining the powder having the defined particle size, the powder prepared by grinding shall be suitably classified through a sieve having a desired mesh size.

In consideration of the melt moldability and the surface appearance of the moldings to be obtained herein, the filler size is preferably such that the filler particles pass through a sieve that corresponds to 1000 µm, more preferably a sieve that corresponds to 800 µm, even more preferably a sieve that corresponds to 500 µm, measured according to the sieving test method of JIS-K0069. Regarding the lowermost limit of the filler size, filler particles not substantially pass through a sieve that corresponds to 5 µm are preferred in view of their handlability. The condition "not substantially pass" means that at least 95% by weight of the filler particles tried do not pass through the tested sieve.

The filler of the type may be selected from commercially-available ones, or may be prepared by classifying filler particles through a sieve to select those of the necessary size. Regarding the shape of the filler for use herein, preferred are fibrous, tabular, flaky and ground fillers in view of the productivity of the tablets of the composition. More preferred are fibrous, tabular or flaky fillers in view of the strength of the moldings to be obtained herein.

Further if desired, two or more fillers of different particle sizes may be combined, depending on the necessary characteristics thereof.

When optional components are added to the resin composition, the method of adding them is not specifically defined. For example, powder of thermoplastic resin composition prepared by previously melt-kneading thermoplastic resin with optional components may be used as thermoplastic resin powder; or optional components may be added to the solid-phase system in which thermoplastic resin powder is uniformly blended with filler, and these are blended all together. In case where powder of the composition that is prepared by previously melt-kneading thermoplastic resin and filler is used, optional components may also be added to the system being meld-kneaded so that the components may be blended all together. If desired, optional components may be adhered to the surfaces of tablets so as to be added thereto.

In consideration of the shape retentiveness during transportation and of the possibility of easy collapse during molding, the shape of the tablets may be, for example, columnar, elliptic columnar, conical, spherical, ellipsoidal, oval, masekku, disk-like, cubic or prism-like. Above all, the shape of the tablets is preferably columnar, elliptic columnar, spherical, ellipsoidal, oval or "Masekku", in view of the metering stability during processing.

The size of the tablets is preferably such that the diameter of the bottom face is at most 15 mm and the length is at most 20 mm. More preferably, the maximum value of the diameter of the bottom face or the length (height) is smaller than 15 mm, and the minimum value thereof is at least 1 mm. For the tablets of which the bottom face is not circular, the maximum diameter and the minimum diameter are defined as follows: Of a virtual rectangular parallelepiped container capable of accepting the tablet to be measured, the maximum value and the minimum value of any of the length, the width or the height are measured. Thus measured, the maximum value of any of the length, the width or the height or the diameter of the tablets is preferably smaller than 15 mm, more preferably at most 12 mm. Also preferably, the minimum value thereof is at least 1 mm, more preferably at least 1.5 mm.

According to the method as herein, a filler-rich resin composition which no one could heretofore reach can be obtained.

Preferably, the specific gravity of the filler is at most 3.5 in order that the filler may be uniformly blended with thermoplastic resin, more preferably at most 3. In case where multiple fillers of different types are combined and used herein, it is desirable that the specific gravity of at least one filler of which the amount is the largest of all is within the defined range.

EXAMPLES

The tablets are described in detail with reference to the following Examples, but the spirit of the disclosures is not limited to only the following Examples.

Reference Example 1

Thermoplastic Resin

PPS-1 (Linear Type):
Polyphenylene sulfide, M2588 (by Toray) was ground in a sample mill (Kyoritsu Riko's SK-M Model), and classified through a 60 mesh-pass, 150 mesh-on sieve to obtain resin particles having a number-average particle size of 200 μm.

PPS-2 (Linear Type):
Polyphenylene sulfide, M2588 (by Toray) was ground in a sample mill (Kyoritsu Riko's SK-M Model), and classified through a 16 mesh-pass, 30 mesh-on sieve to obtain resin particles having a number-average particle size of 800 μn.

PA6:
Polyamide, CM1001 (by Toray) was dipped in liquid nitrogen, then ground in a sample mill (Kyoritsu Riko's SK-M Model), and classified through a 42 mesh-pass, 80 mesh-on sieve to obtain resin particles having a number-average particle size of 300 μm.

LCP:
Liquid-crystalline polyester, Siveras L201E (by Toray) was dipped in liquid nitrogen, then ground in a sample mill (Kyoritsu Riko's SK-M Model), and classified through a 80 mesh-pass, 150 mesh-on sieve to obtain resin particles having a number-average particle size of 150 μm.

PC:
Polycarbonate, Iupilon H3000 (by Mitsubishi Enpla) was dipped in liquid nitrogen, then ground in a sample mill (Kyoritsu Riko's SK-M Model), and classified through a 60 mesh-pass, 150 mesh-on sieve to obtain resin particles having a number-average particle size of 200 μm.

PBT:
Polybutylene terephthalate, 1100S (by Toray) was dipped in liquid nitrogen, then ground in a sample mill (Kyoritsu Riko's SK-M Model), and classified through a 42 mesh-pass, 80 mesh-on sieve to obtain resin particles having a number-average particle size of 300 μm.

In the above, the number-average particle size of resin was measured with a laser diffraction particle analyzer by Shimadzu.

Reference Example 2

Filler

Carbon fibers (CF): MLD30 (fibrous filler, fiber diameter 7 μm, by Toray).
Glass fibers (GF): EPDM70M10A (fibrous filler, by Nippon Electric Glass).
Graphite (KS): KS-75 (flaky filler, by Timcal Japan).
Mica powder (MK): A-31 (tabular filler, by Yamaguchi Mica Industry).

The filler size in the Tables below means that, when 500 g of the sample was taken out and classified through the sieve that corresponds to the size indicated, no particle remained on the sieve.

Reference Example 3

Substance (X) that Changes from Solid into Liquid or Vapor within a Temperature Range of from 25 to 250° C. (those Mentioned Below are all Particles Passed Through a 42 Mesh-Pass Sieve)

TA: triallyl cyanate (by Aldrich), m.p. 156° C.
EBA: ethylenebisstearamide, Armowax (by Lion Akzo), m.p. 140° C.
BSL: barium stearate (by Nitto Chemical Industry), m.p. 153° C.
IRN: N,N'-hexamethylenebis(3,5-di-t-butyl-4-hydroxyhydrocinnamide), Irganox 1098 (by Ciba-Geigy Japan), m.p. 158° C.
IRG: tris(2,4-di-t-butylphenyl)phosphate, Irgafos 168 (by Ciba-Geigy Japan), m.p. 182° C.
UVI: 2,5-bis(5'-t-butylbenzoxazolyl(2))thiophene, Ubitex OB (by Ciba-Geigy Japan), m.p. 200° C.
PEP: di(2,4-di-t-butylphenyl)pentaerythritol diphosphite, MARK PEP24G (by Adeka Argus), m.p. 170° C.
HWE: montanate wax, Ricowax (by Clariant Japan), m.p. 78° C.

Reference Example 4

Liquid Organic Compound

BPD: polyoxyethylene bisphenol A laurate, Exepearl BP-DL (by Kao), viscosity at 25° C., 280 mPa·s.

MAR: tetratridecyl-4,4'-butylidenebis-(3-methyl-6-t-butylphenol)diphosphite, MARK 260 (by Adeka Argus), viscosity at 25° C., 1100 mPa·s.

DBP: dibutyl phthalate, DBP (by Daihachi Chemical), viscosity at 25° C., 16 mPa·s.

Reference Example 5

Phosphate

PX: PX-200 (Daihachi Chemical's powdery aromatic condensed phosphate, CAS No. 139189-30-3, particles passed through 42 mesh-pass sieve).

CR: CR-741 (Daihachi Chemical's liquid aromatic condensed phosphate, CAS No. 5945-33-5).

Examples 1 to 12

The thermoplastic resin of Reference Example 1 was blended with a predetermined amount of the filler of Reference Example 2, in a ribbon blender. Using a rotary tabletting machine with a feeder by Tsukishima Machinery, the resulting blend was tabletted at room temperature into tablets of 7 mm diameter×5 mm length (maximum 7 mm, minimum 5 mm) each. Next, using a press-molding machine, the tablets were molded into tabular moldings of 150 mm×150 mm×2 mm thickness each. The temperature is as in Table 1, and the pressure was 5 MPa. In addition, the tablets were molded in a mode of injection-molding, and their properties were evaluated according to the methods mentioned below.

Comparative Example 1

The thermoplastic resin of Reference Example 1 was blended with a predetermined amount of the filler of Reference Example 2, in a ribbon blender. Using a double-screw extruder PCM30 (by Ikegai Tekko) with a strand die head of 4 mm diameter×3 holes, the resulting was formed into a melt-kneadable filler-rich composition. The temperature is as in Table 1, and the screw revolution was 100 rpm. This was tested and evaluated in the same manner as in the above-mentioned Examples.

Comparative Examples 2 to 8

The thermoplastic resin of Reference Example 1 was blended with a predetermined amount of the filler of Reference Example 2, in a ribbon blender. Using a double-screw extruder PCM30 (by Ikegai Tekko) with a strand die head of 4 mm diameter×3 holes, the resulting blend was melt-kneaded at the resin temperature indicated in Table 1, but in vain.

Examples 13 to 29

In a ribbon blender, the thermoplastic resin of Reference Example 1, the filler of Reference Example 2, and the substance (X) capable of changing from solid into liquid or vapor at a temperature falling between 25 and 250° C. of Reference Example 3 were blended in a predetermined ratio. Using a rotary tabletting machine with a feeder by Tsukishima Machinery, the resulting blend was tabletted at room temperature into tablets of 7 mm diameter×5 mm length (maximum 7 mm, minimum 5 mm) each. Next, using a press-molding machine, the tablets were molded into tabular moldings of 150 mm×150 mm×2 mm thickness each. The temperature is as in Table 1, and the pressure was 5 MPa. In addition, the tablets were molded in a mode of injection-molding, and their properties were evaluated according to the methods mentioned below.

Control Examples 1 to 9

Not contain the substance (X) capable of changing from solid into liquid or vapor at a temperature that falls between 25 and 250° C. of Reference Example 3, these correspond to Examples 1 to 4, Examples 6 to 8 and Examples 11 and 12.

Examples 30 to 41

In a ribbon blender, the thermoplastic resin of Reference Example 1, the filler of Reference Example 2, and the liquid organic compound of Reference Example 4 were blended in a predetermined ratio. Using a rotary tabletting machine by Tsukishima Machinery, the resulting blend was tabletted at room temperature into tablets of 7 mm diameter×5 mm length (maximum 7 mm, minimum 5 mm) each. Next, using a press-molding machine, the tablets were molded into tabular moldings of 150 mm×150 mm×2 mm thickness each. The temperature is as in Table 1, and the pressure was 5 MPa. In addition, the tablets were molded in a mode of injection-molding, and their properties were evaluated according to the methods mentioned below.

Control Examples 10 to 18

Not contain the liquid compound of Reference Example 4, these correspond to Examples 1 to 4, Examples 6 to 8 and Examples 11 and 12.

Examples 42 to 51

In a ribbon blender, the thermoplastic resin of Reference Example 1, the filler of Reference Example 2, and the phosphate of Reference Example 5 were blended in a predetermined ratio. Using a rotary tabletting machine with a feeder by Tsukishima Machinery, the resulting blend was tabletted at room temperature into tablets of 7 mm diameter×5 mm length (maximum 7 mm, minimum 5 mm) each. Next, using a press-molding machine, the tablets were molded into tabular moldings of 150 mm×150 mm×2 mm thickness each. The temperature is as in Table 1, and the pressure was 5 MPa. In addition, the tablets were molded in a mode of injection-molding, and their properties were evaluated according to the methods mentioned below.

Control Examples 19 to 27

Not contain the phosphate of Reference Example 4, these correspond to Examples 1 to 4, Examples 6 to 8 and Examples 11 and 12.

(1) Linear Expansion Coefficient (Dimensional Stability):

This is to evaluate the dimensional stability of the tabular moldings. At its center, each molding was cut to give a prism sample of 10 mm length×1 mm width×2 mm thickness. Using TMA (by Seiko Electronics), the sample was measured at 30° C. to 70° C. (5° C./min).

(2) Warp Deformation:

The tabular moldings of 150 mm×150 mm×2 mm thickness were annealed at 120° C. for 2 hours. Then, each sample was left as it was, with one of its four edges being fixed, and the lifting-up warp deformation at the diagonal side of the fixed end of the sample was measured. OO indicates that the deformation was less than 1 mm; O indicates that the deformation was from 1 to 3 mm; and × indicates that the deformation was more than 3 mm.

(3) Metering Stability 1 (Metering Time):

An injection-molding machine, Sumitomo SG75M-III (by Sumitomo Heavy Industries) was used. The tablets were metered into the cylinder to a height of 60 mm, and the time taken by it was measured. The resin temperature is as in Table 1; and the screw revolution was rated through load pressure control. (Shorter time for metering means better metering stability.)

(4) Metering Stability 2 (Metering Time Fluctuation):

Using the injection-molding machine, Sumitomo SG75M-III (by Sumitomo Heavy Industries), the tablets were metered for 10 shots, and the time taken by each shot was measured. The resin temperature is as in Table 1; and the screw revolution was 30 rpm. The metering time fluctuation was obtained according to the following equation: (Metering time fluctuation)=(maximum metering time in 10 shots)−(minimum metering time in 10 shots).

(5) Metering Stability 3 (Load Torque):

Using the injection-molding machine, Sumitomo SG75M-III (by Sumitomo Heavy Industries), the tablets were metered, and the load pressure to the screw motor was measured. The resin temperature is as in Table 1; and the screw revolution was 30 rpm. (Lower load pressure means better metering stability.)

(6) Flowability:

Using a molding machine, J85ELIII-UPS (by Nippon Steel Manufacture), the tablets were tried whether they could be molded into 80×80×3 mm thickness tabular moldings. The resin temperature and the mold temperature are as in Table 1. The samples were evaluated as follows: O indicates that the molding succeeded even to the end of the mold cavity, and x indicates that the molding failed as burrs appeared before the end of the mold cavity.

The test results are given in Table 4.

TABLE 1

|  | Resin (vol. %) | Filler (vol. %) | Filler Specific Gravity | Filler Size (μm) | Resin Temperature (° C.) | Mold Temperature (° C.) | Dimensional Stability (×10$^{-5}$ l/° C.) | Warp Deformation |
|---|---|---|---|---|---|---|---|---|
| Example 1 | PPS-1 (13) | CF (87) | 1.76 | <150 | 340 | 150 | 0.53 | O |
| Example 2 | PPS-2 (13) | CF (87) | 1.76 | <150 | 340 | 150 | 0.60 | O |
| Example 3 | PA6 (15) | CF (85) | 1.76 | <150 | 300 | 90 | 0.62 | O |
| Example 4 | LCP (16) | CF (84) | 1.76 | <150 | 350 | 130 | 0.46 | O |
| Example 5 | LCP (26) | KS (74) | 2.23 | <75 | 350 | 130 | 0.48 | O |
| Example 6 | PPS-1 (17) | GF (83) | 2.51 | <200 | 340 | 150 | 0.90 | O |
| Example 7 | PPS-1 (16) | KS (84) | 2.23 | <75 | 340 | 150 | 0.64 | O |
| Example 8 | PPS-1 (19) | MK (81) | 2.85 | <50 | 340 | 150 | 1.05 | O |
| Example 9 | PPS-1 (30) | KS (70) | 2.23 | <75 | 340 | 150 | 0.72 | O |
| Example 10 | PPS-1 (25) | KS (75) | 2.23 | <75 | 340 | 150 | 0.70 | O |
| Example 11 | PBT (25) | KS (75) | 2.23 | <75 | 290 | 90 | 0.61 | O |
| Example 12 | PC (30) | KS (70) | 2.23 | <75 | 320 | 130 | 0.65 | O |
| Comp. Ex. 1 | PPS-1 (43) | CF (57) | 1.76 | <150 | 340 | 150 | 1.2 | X |
| Comp. Ex. 2 | PPS-1 (13) | CF (87) | 1.76 | <150 | 340 | — | kneading impossible |  |
| Comp. Ex. 3 | PPS-1 (17) | GF (83) | 2.51 | <200 | 340 | — | kneading impossible |  |
| Comp. Ex. 4 | PPS-1 (16) | KS (84) | 2.23 | <75 | 340 | — | kneading impossible |  |
| Comp. Ex. 5 | PPS-1 (19) | MK (81) | 2.85 | <50 | 340 | — | kneading impossible |  |
| Comp. Ex. 6 | LCP (26) | KS (74) | 2.23 | <75 | 350 | — | kneading impossible |  |
| Comp. Ex. 7 | PBT (25) | KS (75) | 2.23 | <75 | 290 | — | kneading impossible |  |
| Comp. Ex. 8 | PC (30) | KS (70) | 2.23 | <75 | 320 | — | kneading impossible |  |

TABLE 2

|  | Thermoplastic Resin (vol. %) | Filler (vol. %) | Substance (X) (wt. pts.) | Filler Specific Gravity | Filler Size (μm) | Resin Temperature (° C.) | Mold Temperature (° C.) | Dimensional Stability (×10$^{-5}$ l/° C.) | Warp Deformation | Metering Stability (sec) |
|---|---|---|---|---|---|---|---|---|---|---|
| Example 13 | PPS-1 (13) | CF (87) | TA (6) | 1.76 | <150 | 340 | 150 | 0.47 | OO | 10 |
| Example 14 | PPS-2 (13) | CF (87) | TA (6) | 1.76 | <150 | 340 | 150 | 0.53 | OO | 11 |
| Example 15 | PA6 (15) | CF (85) | HWE (6) | 1.76 | <150 | 300 | 90 | 0.58 | OO | 12 |
| Example 16 | LCP (16) | CF (84) | HWE (5) | 1.76 | <150 | 350 | 130 | 0.43 | OO | 10 |
| Example 17 | LCP (26) | KS (74) | HWE (5) | 2.23 | <75 | 350 | 130 | 0.46 | OO | 10 |
| Example 18 | PPS-1 (19) | MK (81) | TA (5) | 2.85 | <50 | 340 | 150 | 0.90 | OO | 13 |
| Example 19 | PPS-1 (17) | GF (83) | TA (5) | 2.51 | <200 | 340 | 150 | 0.82 | OO | 13 |
| Example 20 | PPS-1 (16) | KS (84) | EBA (7) | 2.23 | <75 | 340 | 150 | 0.58 | OO | 12 |
| Example 21 | PPS-1 (13) | KS (87) | TA (6) | 2.23 | <75 | 340 | 150 | 0.57 | OO | 12 |
| Example 22 | PPS-1 (13) | KS (87) | BSL (6) | 2.23 | <75 | 340 | 150 | 0.59 | OO | 14 |
| Example 23 | PPS-1 (13) | KS (87) | IRN (8) | 2.23 | <75 | 340 | 150 | 0.57 | OO | 12 |
| Example 24 | PPS-1 (13) | KS (87) | IRG (8) | 2.23 | <75 | 340 | 150 | 0.57 | OO | 12 |
| Example 25 | PPS-1 (13) | KS (87) | UVI (7) | 2.23 | <75 | 340 | 150 | 0.58 | OO | 14 |
| Example 26 | PPS-1 (13) | KS (87) | PEP (8) | 2.23 | <75 | 340 | 150 | 0.55 | OO | 10 |
| Example 27 | PPS-1 (13) | KS (87) | HWE (5) | 2.23 | <75 | 340 | 150 | 0.61 | OO | 16 |
| Example 28 | PBT (25) | KS (75) | PEP (8) | 2.23 | <75 | 290 | 90 | 0.60 | OO | 12 |
| Example 29 | PC (39) | KS (70) | PEP (6) | 2.23 | <75 | 320 | 130 | 0.63 | OO | 12 |

TABLE 2-continued

|  | Thermo-plastic Resin (vol. %) | Filler (vol. %) | Substance (X) (wt. pts.) | Filler Specific Gravity | Filler Size (μm) | Resin Temperature (° C.) | Mold Temperature (° C.) | Dimensional Stability (×10⁻⁵ l/° C.) | Warp Deformation | Metering Stability (sec) |
|---|---|---|---|---|---|---|---|---|---|---|
| Cont. Ex. 1 | PPS-1 (13) | GF (87) | — | 1.76 | <150 | 340 | 150 | 0.53 | ○ | 220 |
| Cont. Ex. 2 | PPS-2 (13) | GF (87) | — | 1.76 | <150 | 340 | 150 | 0.60 | ○ | 240 |
| Cont. Ex. 3 | PA6 (15) | GF (85) | — | 1.76 | <150 | 300 | 90 | 0.62 | ○ | 280 |
| Cont. Ex. 4 | LCP (16) | GF (84) | — | 1.76 | <150 | 350 | 130 | 0.46 | ○ | 180 |
| Cont. Ex. 5 | PPS-1 (17) | GF (83) | — | 2.51 | <200 | 340 | 150 | 0.90 | ○ | 200 |
| Cont. Ex. 6 | PPS-1 (16) | KS (84) | — | 2.23 | <75 | 340 | 150 | 0.64 | ○ | 260 |
| Cont. Ex. 7 | PPS-1 (19) | MK (81) | — | 2.85 | <50 | 340 | 150 | 1.05 | ○ | 210 |
| Cont. Ex. 8 | PBT (25) | KS (75) | — | 2.23 | <75 | 290 | 90 | 0.61 | ○ | 240 |
| Cont. Ex. 9 | PC (30) | KS (70) | — | 2.23 | <75 | 320 | 130 | 0.65 | ○ | 240 |

The amount of the substance (X) is in terms of parts by weight relative to 100 parts by weight of the total of the thermoplastic resin and the filler.

The amount of the thermoplastic resin and the filler is in terms of % by volume relative to the total of the thermoplastic resin and the filler, 100% by volume.

TABLE 3

|  | Thermo-plastic Resin (vol. %) | Filler (vol. %) | Liquid Organic Compound (wt. pts.) | Filler Specific Gravity | Filler Size (μm) | Resin Temperature (° C.) | Mold Temperature (° C.) | Dimensional Stability (×10⁻⁵ l/° C.) | Warp Deformation | Metering Time Fluctuation (sec) |
|---|---|---|---|---|---|---|---|---|---|---|
| Example 30 | PPS-1 (13) | CF (87) | BPD (6) | 1.76 | <150 | 340 | 150 | 0.49 | ○○ | 1.2 |
| Example 31 | PPS-2 (13) | CF (87) | BPD (6) | 1.76 | <150 | 340 | 150 | 0.55 | ○○ | 2.0 |
| Example 32 | PA6 (15) | CF (85) | BPD (6) | 1.76 | <150 | 300 | 90 | 0.59 | ○○ | 1.8 |
| Example 33 | LCP (16) | CF (84) | BPD (6) | 1.76 | <150 | 350 | 130 | 0.45 | ○○ | 1.6 |
| Example 34 | LCP (26) | KS (74) | BPD (5) | 2.23 | <75 | 350 | 130 | 0.46 | ○○ | 1.2 |
| Example 35 | PPS-1 (19) | MK (81) | BPD (6) | 2.85 | <50 | 340 | 150 | 0.92 | ○○ | 2.3 |
| Example 36 | PPS-1 (17) | GF (83) | BPD (6) | 2.51 | <200 | 340 | 150 | 0.83 | ○○ | 1.4 |
| Example 37 | PPS-1 (16) | KS (84) | BPD (6) | 2.23 | <75 | 340 | 150 | 0.59 | ○○ | 1.3 |
| Example 38 | PPS-1 (13) | KS (87) | MAR (7) | 2.23 | <75 | 340 | 150 | 0.61 | ○○ | 4.1 |
| Example 39 | PPS-1 (13) | KS (87) | BPD (6) | 2.23 | <75 | 340 | 150 | 0.59 | ○○ | 1.8 |
| Example 40 | PBT (25) | KS (75) | MAR (8) | 2.23 | <75 | 290 | 90 | 0.60 | ○○ | 2.8 |
| Example 41 | PC (30) | KS (70) | MAR (6) | 2.23 | <75 | 320 | 130 | 0.60 | ○○ | 2.1 |
| Cont. Ex. 10 | PPS-1 (13) | CF (87) | — | 1.76 | <150 | 340 | 150 | 0.53 | ○ | 25 |
| Cont. Ex. 11 | PPS-1 (13) | CF (87) | — | 1.76 | <150 | 340 | 150 | 0.60 | ○ | 30 |
| Cont. Ex. 12 | PA6 (15) | CF (85) | — | 1.76 | <150 | 300 | 90 | 0.62 | ○ | 24 |
| Cont. Ex. 13 | LCP (16) | CF (84) | — | 1.76 | <150 | 350 | 130 | 0.46 | ○ | 28 |
| Cont. Ex. 14 | PPS-1 (17) | GF (83) | — | 2.51 | <200 | 340 | 150 | 0.90 | ○ | 18 |
| Cont. Ex. 15 | PPS-1 (16) | KS (84) | — | 2.23 | <75 | 340 | 150 | 0.64 | ○ | 23 |
| Cont. Ex. 16 | PPS-1 (19) | MK (81) | — | 2.85 | <50 | 340 | 150 | 1.05 | ○ | 20 |
| Cont. Ex. 17 | PBT (25) | KS (75) | — | 2.23 | <75 | 290 | 90 | 0.61 | ○ | 18 |
| Cont. Ex. 18 | PC (30) | KS (70) | — | 2.23 | <75 | 320 | 150 | 0.65 | ○ | 15 |

The amount of the liquid organic compound is in terms of parts by weight relative to 100 parts by weight of the total of the thermoplastic resin and the filler.

The amount of the thermoplastic resin and the filler is in terms of % by volume relative to the total of the thermoplastic resin and the filler, 100% by volume.

TABLE 4

|  | Thermo-plastic Resin (vol. %) | Filler (vol. %) | Phosphate (wt. pts.) | Filler Specific Gravity | Filler Size (μm) | Resin Temperature (° C.) | Mold Temperature (° C.) | Dimensional Stability (×10⁻⁵ l/° C.) | Warp Deformation | Metering Stability (MPa) | Flow-ability |
|---|---|---|---|---|---|---|---|---|---|---|---|
| Example 42 | PPS-1 (13) | CF (87) | PX (5) | 1.76 | <150 | 340 | 150 | 0.45 | ○○ | 2.8 | ○ |
| Example 43 | PPS-2 (13) | CF (87) | CR (7) | 1.76 | <150 | 340 | 150 | 0.50 | ○○ | 3.3 | ○ |
| Example 44 | PA6 (15) | CF (85) | PX (5) | 1.76 | <150 | 300 | 90 | 0.55 | ○○ | 2.8 | ○ |
| Example 45 | LCP (16) | CF (84) | PX (3) | 1.76 | <150 | 350 | 130 | 0.40 | ○○ | 2.8 | ○ |
| Example 46 | LCP (28) | KS (74) | PX (3) | 2.23 | <75 | 350 | 130 | 0.42 | ○○ | 3.2 | ○ |
| Example 47 | PPS-1 (17) | GF (83) | PX (5) | 2.51 | <200 | 340 | 150 | 0.82 | ○○ | 2.8 | ○ |
| Example 48 | PPS-1 (16) | KS (84) | PX (5) | 2.23 | <75 | 340 | 150 | 0.55 | ○○ | 2.8 | ○ |
| Example 49 | PPS-1 (19) | MK (81) | PX (5) | 2.85 | <50 | 340 | 150 | 0.80 | ○○ | 2.8 | ○ |

TABLE 4-continued

|  | Thermoplastic Resin (vol. %) | Filler (vol. %) | Phosphate (wt. pts.) | Filler Specific Gravity | Filler Size (μm) | Resin Temperature (°C.) | Mold Temperature (°C.) | Dimensional Stability (×10⁻⁵ l/°C.) | Warp Deformation | Metering Stability (MPa) | Flowability |
|---|---|---|---|---|---|---|---|---|---|---|---|
| Example 50 | PBT (25) | KS (75) | PX (6) | 2.23 | <75 | 290 | 90 | 0.58 | ◯◯ | 2.5 | ◯ |
| Example 51 | PC (30) | KS (75) | PX (7) | 2.23 | <75 | 320 | 130 | 0.60 | ◯◯ | 2.8 | ◯ |
| Cont. Ex. 19 | PPS-1 (13) | CF (87) | — | 1.76 | <150 | 340 | 150 | 0.53 | ◯ | 12.5 | X |
| Cont. Ex. 20 | PPS-2 (13) | CF (87) | — | 1.76 | <150 | 340 | 150 | 0.60 | ◯ | 13.0 | X |
| Cont. Ex. 21 | PA6 (15) | CF (85) | — | 1.76 | <150 | 300 | 90 | 0.62 | ◯ | 14.0 | X |
| Cont. Ex. 22 | LCP (16) | CF (84) | — | 1.76 | <150 | 350 | 130 | 0.46 | ◯ | 12.5 | X |
| Cont. Ex. 23 | PPS-1 (17) | GF (83) | — | 2.51 | <200 | 340 | 150 | 0.90 | ◯ | 12.5 | X |
| Cont. Ex. 24 | PPS-1 (16) | KS (84) | — | 2.23 | <75 | 340 | 150 | 0.64 | ◯ | 14.0 | X |
| Cont. Ex. 25 | PPS-1 (19) | MK (81) | — | 2.85 | <50 | 340 | 150 | 1.05 | ◯ | 14.5 | X |
| Cont. Ex. 26 | PBT (25) | KS (75) | — | 2.23 | <75 | 290 | 90 | 0.61 | ◯ | 14.5 | X |
| Cont. Ex. 27 | PC (30) | KS (75) | — | 2.23 | <75 | 320 | 130 | 0.65 | ◯ | 14.5 | X |

The amount of the phosphate is in terms of parts by weight relative to 100 parts by weight of the total of the thermoplastic resin and the filler.

The amount of the thermoplastic resin and the filler is in terms of % by volume relative to the total of the thermoplastic resin and the filler, 100% by volume.

As is obvious from the results in Table 1-4, it is understood that the moldings obtained according to the production method have a high filler content and therefore have additional properties that are in a region no one has ever explored. In addition, adding other additives to the resin tablets bring about other various advantages. When a substance capable of changing from solid into liquid or vapor at a temperature falling between 25 and 250° C. is added thereto, the metering time may be shortened, or that is, the molding cycle may be shortened; when a liquid organic compound is added thereto, the metering time fluctuation may be reduced, or that is, the cylinder packing stability is improved; and when a phosphate is added thereto, the screw motor load in metering may be reduced and the resin flowability is improved. Moreover, since the resin tablets are melt-moldable, they are effective for developing the latent ability of thermoplastic resin for new applications that have heretofore been considered impossible, for example, for light-weight articles substitutable for metal articles.

INDUSTRIAL APPLICABILITY

The tablets are melt-moldable and therefore can be worked into three-dimensional moldings, sheets, containers and others through injection molding, extrusion, pressing, injection pressing or the like. In view of their productivity, injection molding and injection pressing are preferred for working the tablets.

Making the best use to the extreme condition of the filler therein and having the advantage of melt-moldability, the moldings thus obtained are useful, for example, for high-radiation applications, metal-substitutable applications, electromagnetic wave-shielding applications, parts of high-precision instruments (of little dimensional change), collectors, etc. Concretely, they are useful for radiator parts, shield parts or housings for personal computers, liquid-crystal projectors, mobile appliances, portable phones, etc.; as well as parts that must be shielded from electromagnetic waves in the field of information communication, such as installed antennas; and automobile parts, machine parts, outdoor instruments and construction members that must have high dimensional accuracy, electromagnetic wave shieldability, vapor and liquid barrier properties and thermal and electric conductivity; especially for applications for automobile parts, parts of electric and electronic appliances, parts of thermal components and others that are earnestly required to be substitutable for metal for weight reduction, etc.

The invention claimed is:

1. A tablet comprising a thermoplastic resin and a filler, having a compositional ratio of 1 to 50% by volume of the thermoplastic resin and 50 to 99% by volume of the filler, based on the thermoplastic resin and the filler, and 0.1 to 30 parts by weight of at least one of a substance selected from the group consisting of a substance (X) that changes from solid into liquid or vapor at a temperature falling between 25 and 250° C., a liquid organic compound of which the viscosity at 25° C. falls between 1 and 5000 mPa·s and a phosphate, based on 100 parts by weight of the thermoplastic resin and the filler.

2. The tablet as claimed in claim 1, wherein the maximum value of any of the length, the width, the height or the diameter of the tablet is smaller than 15 mm and the minimum value thereof is at least 1 mm.

3. The tablet as claimed in claim 1, having a shape selected from the group consisting of columnar, elliptic columnar, spherical, ellipsoidal, conical, oval and "Masekku."

4. The tablet as claimed in claim 1, wherein the substance (X) is at least one substance selected from the group consisting of monoalcohol esters of fatty acids, metal salts of fatty acids, monoalcohol esters of polybasic acids, fatty acid esters of polyalcohols, and their derivatives, fatty acid esters of glycerin, silicone resins, phenolic compounds, phosphite compounds, thioether compounds, benzophenone compounds, amido group-having compounds, cyanurate compounds and their salts.

5. The tablet as claimed in claim 1, wherein the liquid organic compound is at least one substance selected from the group consisting of monoalcohol esters of fatty acids, monoalcohol esters of polybasic acids, fatty acid esters of polyalcohols, and their derivatives, fatty acid esters of glycerin, silicone oils and phosphite compounds.

6. The tablet as claimed in claim 1, wherein the phosphate compound comprises the following formula (1):

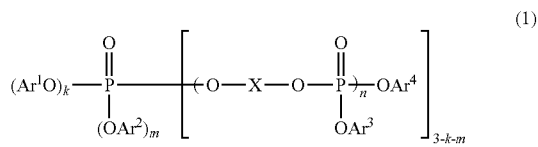

X: 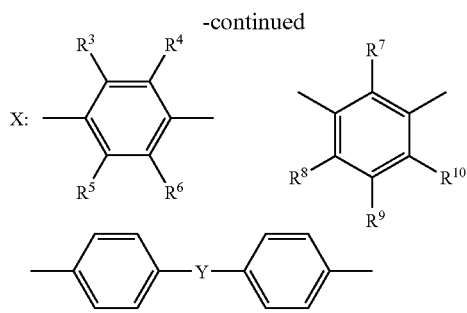

wherein n is an integer of 0 or more, k and m each are an integer of from 0 to 2, $R_3$ to $R_{10}$ are the same or different and each represents a hydrogen atom or an alkyl group having from 1 to 5 carbon atoms, $Ar^1$, $Ar^2$, $Ar^3$ and $Ar^4$ are the same or different and each represents an aromatic group or an aromatic group substituted with a halogen-free organic residue, and Y represents a direct bond, or O, S, $SO_2$, $C(CH_3)_2$, $CH_2$ or CHPh, and Ph represents a phenyl group.

7. A method for producing the tablets any of claims 1 to 6, comprising compression-molding thermoplastic resin powder, filler and at least one substance selected from the group consisting of a substance (X) that changes from solid into liquid or vapor at a temperature falling between 25 and 250° C., a liquid organic compound of which the viscosity at 25° C. falls between 1 and 5000 mPa·s and a phosphate into the tablets, or compression-molding the powder of the resulting composition into the tablets.

8. The method for producing the tablets as claimed in claim 7, wherein tabletting is effected by a tabletting machine or a briquetting machine.

9. The method for producing the tablets as claimed in claim 7, wherein the thermoplastic resin powder has a number-average particle size of at most 1000 μm.

10. Moldings formed by melt-molding the tablets of any of claims 1 to 6.

11. Moldings for automobile parts, parts of electric and electronic appliances, and parts of thermal components, which are formed by injection-molding or injection-pressing the tablets of any of claims 1 to 6.

* * * * *

UNITED STATES PATENT AND TRADEMARK OFFICE
CERTIFICATE OF CORRECTION

PATENT NO. : 7,514,144 B2
APPLICATION NO. : 10/432390
DATED : April 7, 2009
INVENTOR(S) : Umetsu et al.

It is certified that error appears in the above-identified patent and that said Letters Patent is hereby corrected as shown below:

In Column 7
At line 27, please delete "poly-"; at line 27, please delete "ethylene 2, 6 and polyethylene terephthalate;"; and at line 28, please change "nylon 6,6,," to --nylon 6, 6,--.

In Columns 11 and 12
Please replace formula (1) with the following:

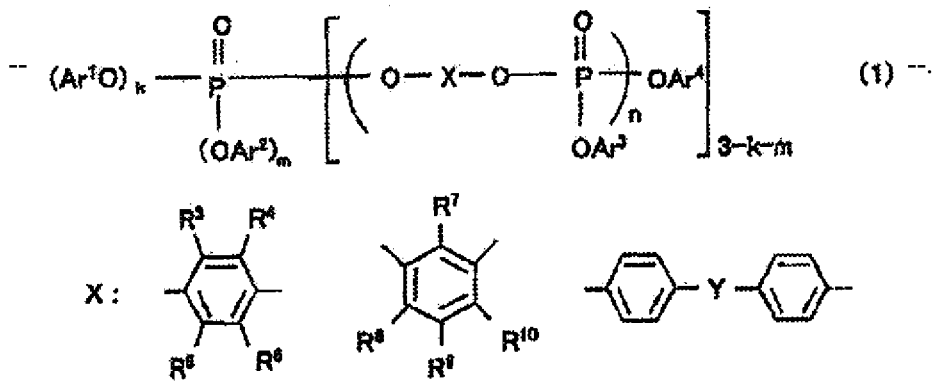

In Column 13
At line 18, after "effect" please change "," to --.--.

Signed and Sealed this

Twenty-third Day of June, 2009

JOHN DOLL
*Acting Director of the United States Patent and Trademark Office*